United States Patent [19]

Potts

[11] Patent Number: 5,851,692

[45] Date of Patent: Dec. 22, 1998

[54] ELECTRONIC DEVICE HAVING A CONCEALED BATTERY LATCH DOOR

[75] Inventor: Anthony Morris Potts, Boynton Beach, Fla.

[73] Assignee: Motorola, Inc., Schaumburg, Ill.

[21] Appl. No.: 847,089

[22] Filed: May 1, 1997

[51] Int. Cl.$^6$ ....................................................... H01M 2/10
[52] U.S. Cl. ................................ 429/100; 429/96; 429/99
[58] Field of Search ................................ 429/96, 97, 98, 429/99, 100

[56] References Cited

U.S. PATENT DOCUMENTS

| | | | |
|---|---|---|---|
| 4,390,198 | 6/1983 | Selinko | 292/152 |
| 4,391,883 | 7/1983 | Williamson et al. | 429/97 |
| 4,880,712 | 11/1989 | Gordecki | 429/97 |
| 5,206,098 | 4/1993 | Cho et al. | 429/96 |
| 5,244,755 | 9/1993 | Benoist et al. | 429/97 |
| 5,270,702 | 12/1993 | Krolak | 340/825.44 |
| 5,307,511 | 4/1994 | Takahashi | 455/90 |
| 5,372,395 | 12/1994 | Yang | 292/147 |
| 5,508,124 | 4/1996 | Gordecki et al. | 429/97 |

*Primary Examiner*—John S. Maples
*Attorney, Agent, or Firm*—Philip P. Macnak

[57] ABSTRACT

A battery door latch (106) for use on an electronic device (100) provides convenient access to batteries (406) located within the electronic device (100) by the device user, visually alerts the device user when the battery door latch (106) is in the unlatched position, and is concealed by the ornamental design of the electronic device (100) when the battery door latch (106) is in the latched position.

20 Claims, 5 Drawing Sheets

SECTION 4-4

SECTION 4-4

802

804

806

808

810

812

814

ELECTRONIC DEVICE HAVING A CONCEALED BATTERY LATCH DOOR

BACKGROUND OF THE INVENTION

This invention relates in general to battery door latches, and more specifically to a concealed battery door latch for an electronic device.

Electronic devices which are powered by a battery are in wide use today. Such electronic devices have one thing in common, a battery door which provides access to a battery compartment located within the electronic device. More sophisticated battery door designs provide a latch which latches the battery door closed, thereby insuring that the battery does not become dislodged from the electronic device, even when the electronic device is accidentally dropped. Such prior art battery door latches also have one thing in common, the latch has been generally conspicuous, and in many instances looks as an afterthought in the design of the electronic device.

What is needed therefor is a battery door latch which is concealed in a manner so as not to detract from the ornamental design of the electronic device.

DESCRIPTION OF THE PREFERRED EMBODIMENTS

Figure 1:
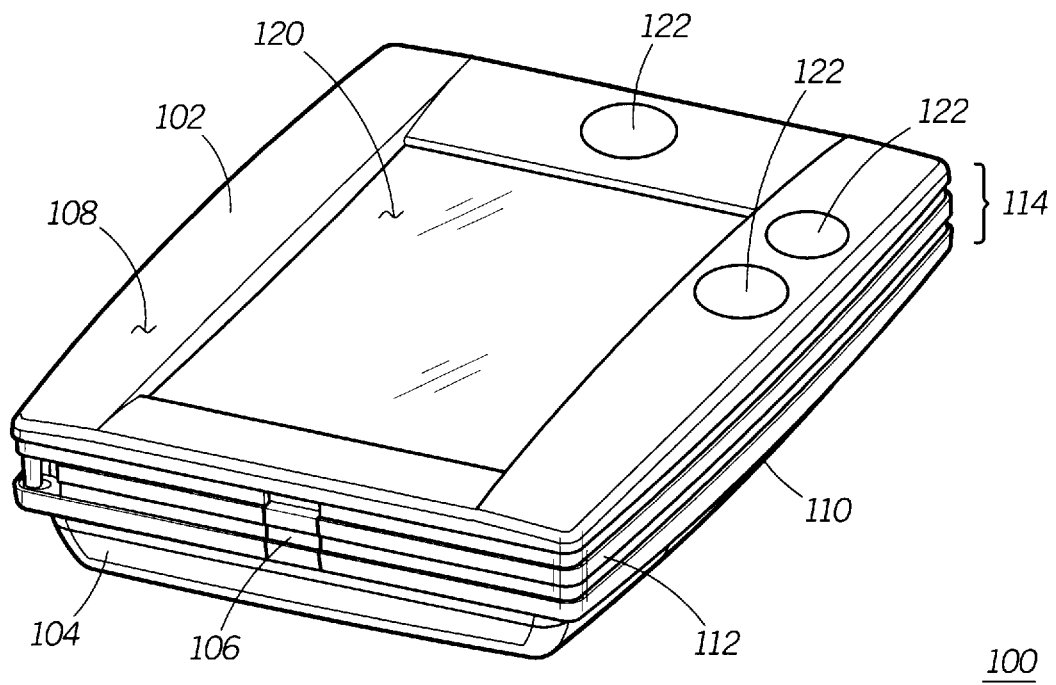
FIG. 1 is a top perspective view of an electronic device which shows a battery door latch which is retained within a surface of a housing and in the latched position in accordance with the preferred embodiment of the present invention.

FIG. 1 is a top perspective view of an electronic device 100 which has a battery door latch 106 which is placed in the latched position in accordance with the preferred embodiment of the present invention. The electronic device 100 includes a housing 102 which includes a battery compartment (602 of FIG. 6), a battery door 104, and a battery door latch 106. The housing 102 includes a front (or top) surface 108, a rear (or bottom) surface 110, and four side walls 112 which includes styling grooves 114 which are part of the ornamental design of the electronic device 100. The ornamental design of the electronic device 100 includes, but is not limited to, styling grooves 114 positioned on the four side walls 112 of the housing 102, at least one of the four side walls being positioned adjacent to the battery compartment. It will be appreciated that the ornamental design represented by the styling grooves 114 can be limited to only one of the four side walls, that which is adjacent to the battery compartment.

The electronic device 100 can include, but is not limited to such electronic devices as a portable communication receiver, a pager, a calculator, or a personal digital assistant. As an example, when the electronic device 100 is a pager, the electronic device 100 can include a display 120 for displaying messages which have been received, and a number of switches 122 (three of which are shown by way of example) which are used to control the operation of the pager in a manner well known to one of ordinary skill in the art. It will be appreciated that numerous other electronic devices incorporate the use of a display and switches as well. The battery door latch 106 is shown in the latched position, in which instance the ornamental design, represented by the styling grooves 114 formed on the battery door latch 106 matches the ornamental design represented by the styling grooves formed on at least the one of the four side walls 112 of the housing 102 in which the battery door latch is located, thereby concealing visually the battery door latch 106.

Figure 2:
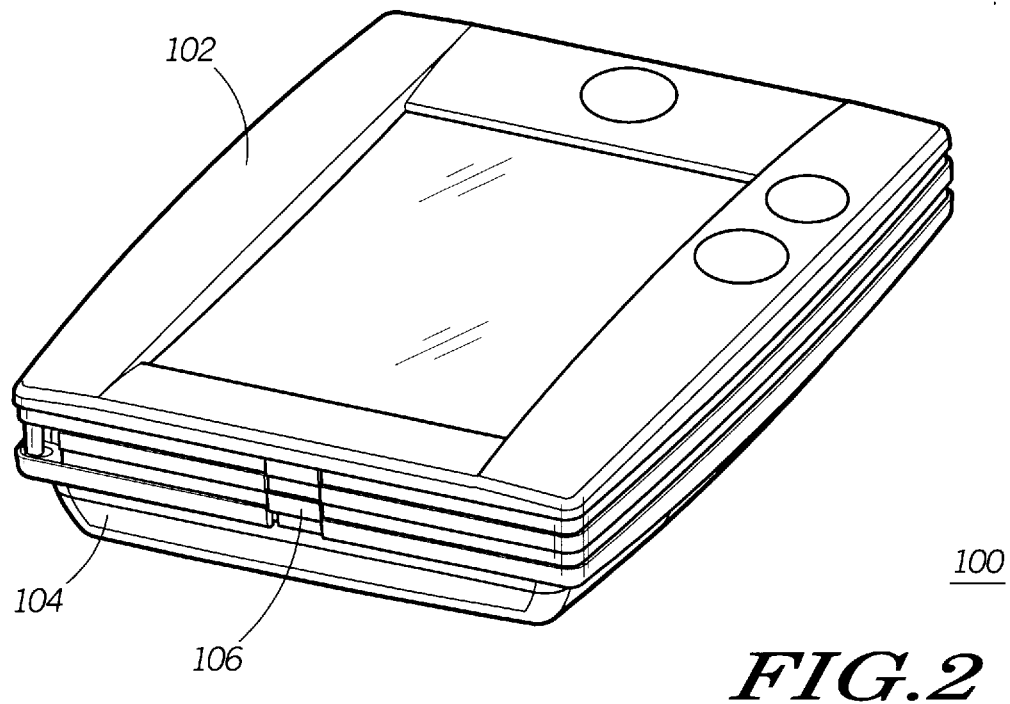
FIG. 2 is a top perspective view of the electronic device of FIG. 1 which shows the battery door latch in the unlatched position in accordance with the present invention.

FIG. 2 is a top perspective view of the electronic device 100 of FIG. 1 which shows the battery door latch 106 placed in the unlatched position in accordance with the present invention. When the battery door latch 106 is placed in the unlatched position, the ornamental design, represented by the styling grooves 114 formed on the battery door latch 106, does not match the ornamental design represented by the styling grooves formed on the side walls of the housing 102 in which the battery door latch is located, thereby providing a visual indication that the battery door latch 106 is placed in the unlatched position. This is a significant improvement over prior art battery door latch designs which have often resorted to providing indicia screened on the latch or the housing to indicated when the battery door latch is unlatched, or to provide marking colors which are visible (or vice-versa) when the battery door latch was unlatched.

Figure 3:
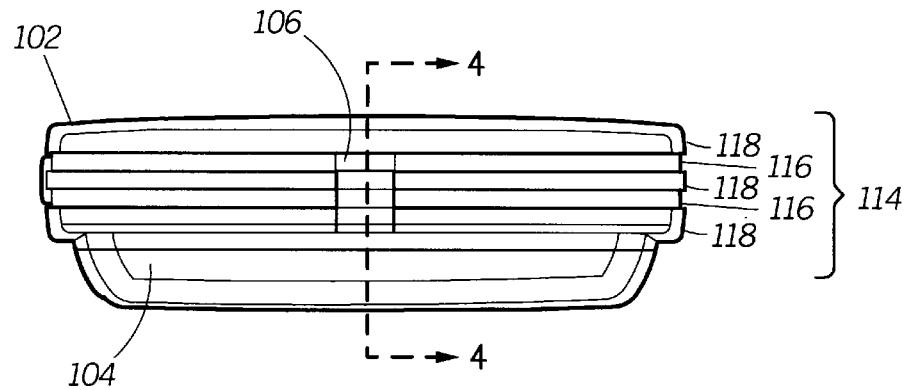
FIG. 3 is a side view of an electronic device of FIG. 1 which shows details of the battery door latch in the latched position in accordance with the present invention.

FIG. 3 is a side view of an electronic device 100 of FIG. 1 which shows the battery door latch 106 in the latched position in accordance with the preferred embodiment of the present invention. As shown in FIG. 3, the styling grooves 114 comprise grooves 116 and ridges 118.

Figure 4:
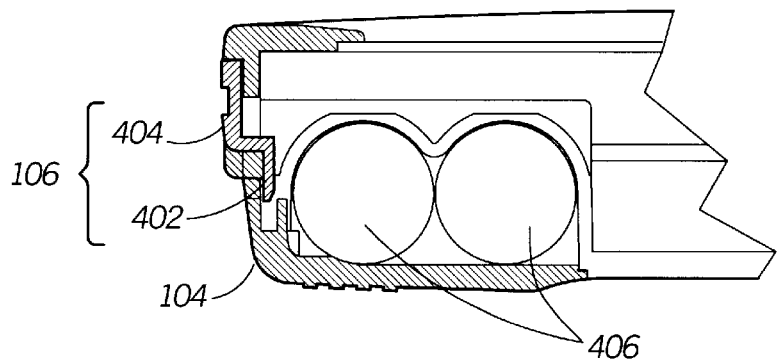
FIG. 4 is a sectional view of the battery door latch shown in the unlatched position in accordance with the present invention.

FIG. 4 is a sectional view of the battery door latch 106 shown in the unlatched position in accordance with the preferred embodiment of the present invention. As shown in FIG. 4, the battery door latch 106 includes a moveable body 404 on which is formed the ornamental design represented by the styling grooves 114, and a tongue 402 which is used to latch the battery door 104. As is shown in FIG. 4, since the battery door latch 106 is in the unlatched position, the tongue 402 does not engage the battery door 104, consequently the battery door can be opened, or removed, providing access to the batteries 406, two of which are shown by way of example.

Figure 5:
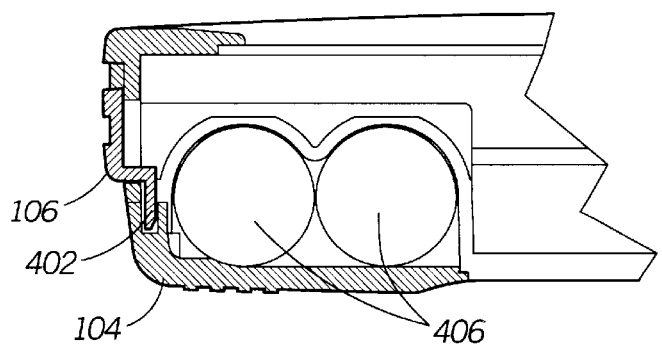
FIG. 5 is a sectional view of the battery door latch shown in the latched position in accordance with the present invention.

FIG. 5 is a sectional view of the battery door latch 106 shown in the latched position in accordance with the preferred embodiment of the present invention. As is shown in FIG. 5, since the battery door latch 106 is in the latched position, the tongue 402 engages the battery door 104.

Figure 6:
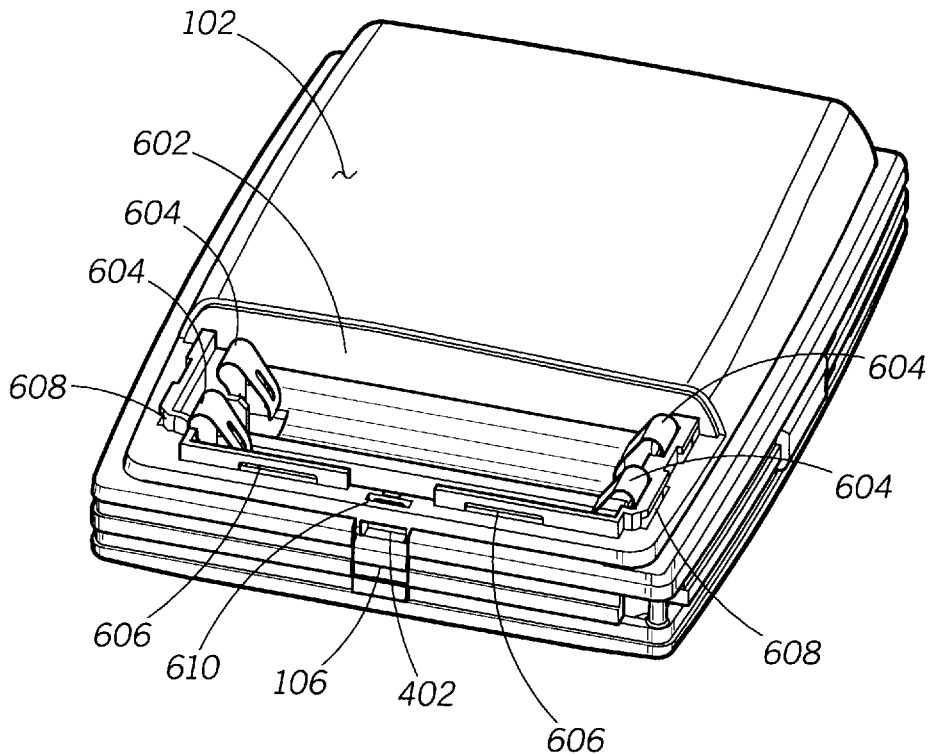
FIG. 6 is a bottom perspective view of the electronic device of FIG. 1 which shows the battery door latch in the unlatched position in accordance with the present invention.

FIG. 6 is a bottom perspective view of the electronic device 100 of FIG. 1 which shows the battery door latch 106 in the unlatched position in accordance with the present invention. The battery compartment 602 is shown exposed without the batteries 406 in place. By way of example, the electronic device 100 shown includes a battery compartment which can accommodate two batteries which make electrical connection to the electronic device 100 through spring loaded battery contacts 604. When the battery door 104 is placed on the housing, tabs formed on the battery door 104 (not shown) engage with undercuts 608 to retain the battery door 104 in position to the housing 102. Additional tabs (not shown) on the battery door 104 engage with slots 606 which are formed contiguous with the side wall of the battery compartment 602. The additional tabs on the battery door 104 prevent the battery door 104 from rotating open during a drop of the electronic device 100. As is shown in FIG. 6, the tongue 402 is recessed within a side wall 112 of the housing 102, and consequently does not engage the battery door 104, consequently, the battery door 104 is unlatched.

Figure 7:
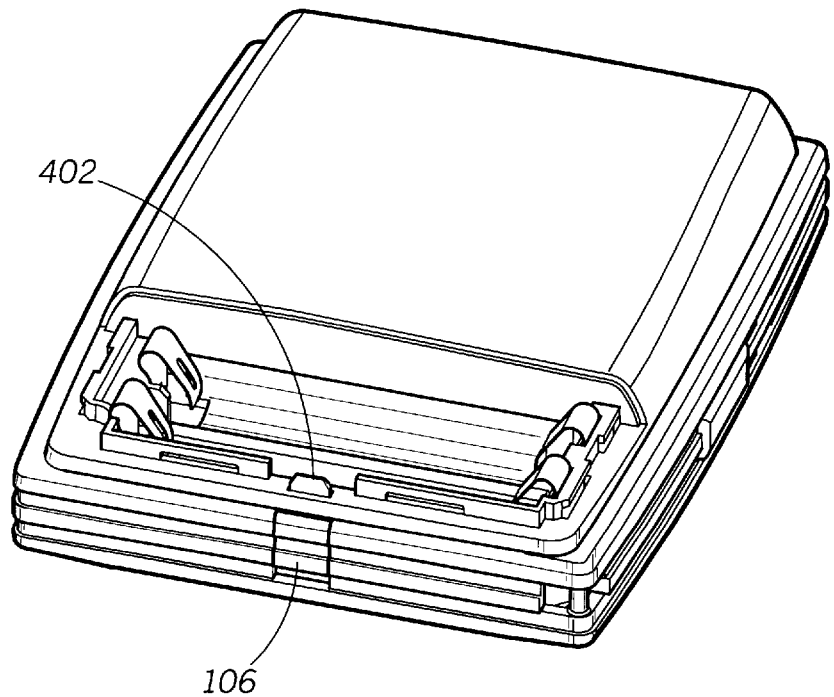
FIG. 7 is a bottom perspective view of the electronic device of FIG. 1 which shows the battery door latch in the latched position in accordance with the present invention.

FIG. 7 is a bottom perspective view of the electronic device of FIG. 1 which shows the battery door latch 106 in the latched position in accordance with the present invention. As is shown in FIG. 7, the tongue 402 is exposed through a slot within the side wall 112 of the battery compartment 602, and consequently is able to engage the battery door 104, consequently, the battery door 104 is latched.

Figure 8:
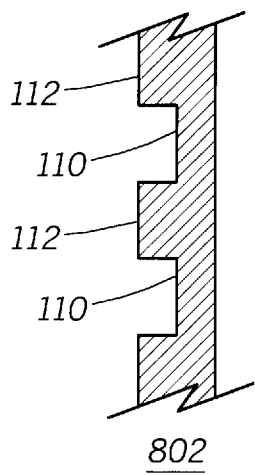
FIG. 8 shows cross-sectional views of alternate embodiments of the ornamental design of the battery door latch in accordance with the present invent.
Figure 8:
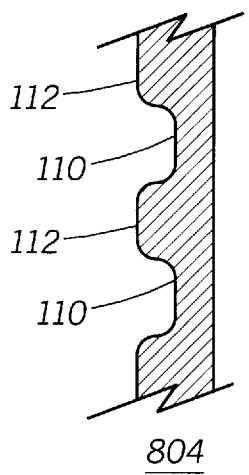
Figure 8:
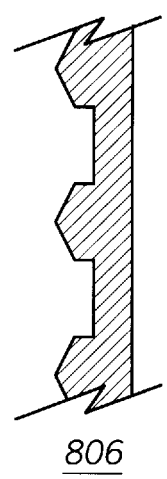
Figure 8:
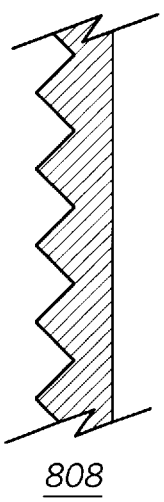
Figure 8:
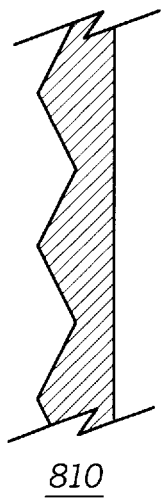
Figure 8:
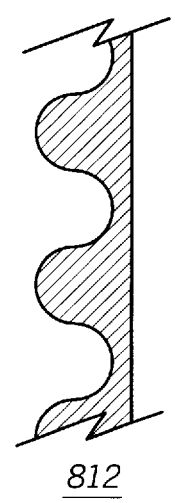
Figure 8:
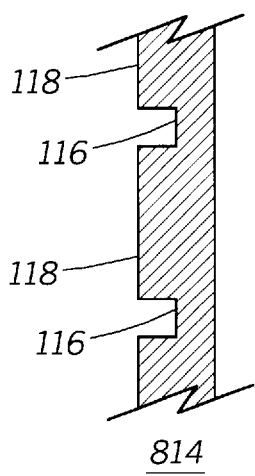

FIG. 8 shows by way of example six cross-sectional views of alternate embodiments of the ornamental design of the housing 102 of the electronic device 100. In one embodiment, an ornamental design 802 can be provided by styling grooves 114 formed by grooves 116 and ridges 118 formed on the battery door latch 106 in accordance with the present invent. In this embodiment, the corners of the grooves 116 and the ridges 118 are square.

In another embodiment of the present invention, an ornamental design 804 can be provided by styling grooves 114 formed by grooves 116 and ridges 118 which have corners that are rounded. In another embodiment of the present invention, an ornamental design 806 can be provided by styling grooves 114 formed by grooves and ridges which have the corners of the grooves square and the ridges peaked atop a rectangular platform. In another embodiment of the present invention, an ornamental design 808 can be provided by styling grooves 114 formed by grooves and ridges which have a steep (narrow) triangular cross-section.

In another embodiment of the present invention, an ornamental design 810 can be provided by styling grooves 114 formed by grooves and ridges which have a shallow (wide) triangular cross-section. In yet another embodiment, an ornamental design 812 can be provided by styling grooves 114 formed by grooves and ridges which have an undulating cross section. In another embodiment of the present invention, an ornamental design 814 can be provided by styling grooves 114 formed by grooves 116 and ridges 118 which are not of uniform width. As shown in the ornamental design 814, the ridges 118 are significantly wider than the grooves 116. It will be appreciated that the grooves 116 can also be significantly wider that the ridges 118 while keeping within the scope and spirit of the present invention.

It will be appreciated that other designs are possible for the ornamental design formed by the styling grooves 114.

The shape of the styling grooves 114 which are formed in the battery door latch 106 also provides a very important function, in addition to being ornamental, in that the pattern of the grooves 116 and ridges 118 can provide a finger grip making it easier for the user of the electronic device 100 to latch and unlatch the battery door.

Figure 9:
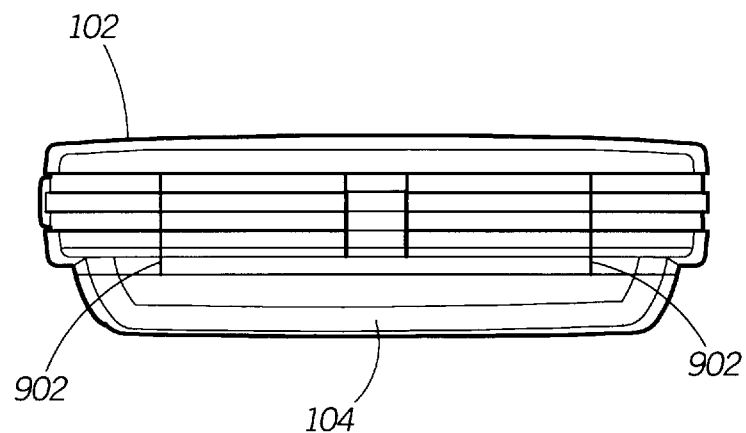
FIG. 9 is a side view of the electronic device of FIG. 1 which shows the battery door latch which is retained within a surface of the battery door and in the latched position in accordance with an alternate embodiment of the present invention.
Figure 10:
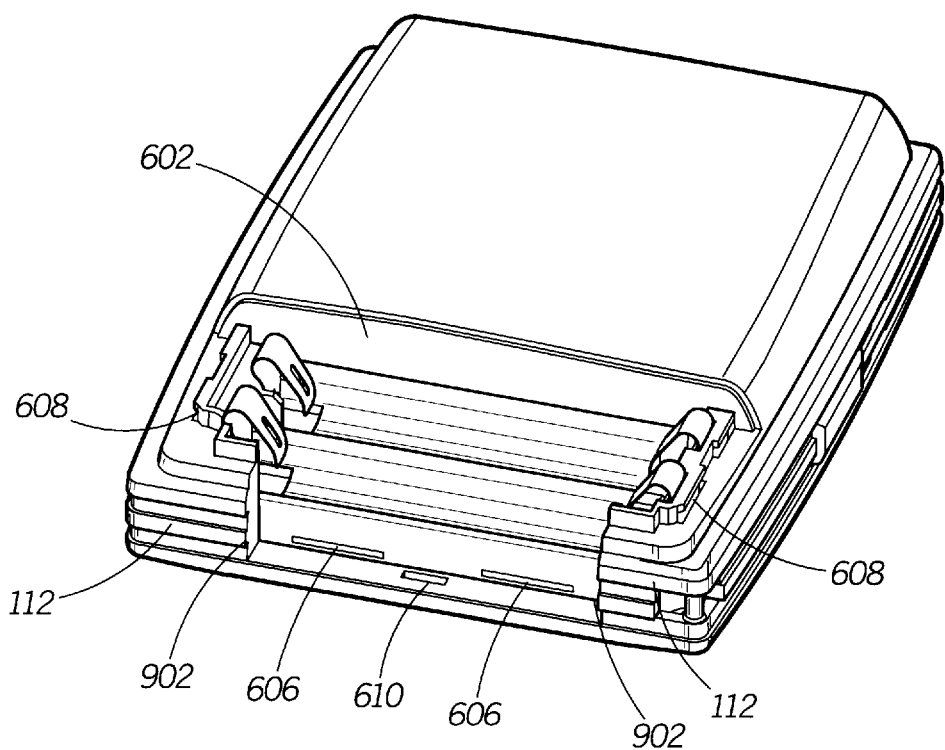
FIG. 10 is a perspective view of the present invention.

FIG. 9 is a side view of an alternate embodiment of the electronic device 100 of FIG. 1 in which the battery door latch 106 is retained within a surface of a battery door 104. FIG. 9 is best understood by reference to FIG. 10 which is a bottom perspective view of the electronic device 100 of FIG. 1 which shows the battery door 104 removed in accordance with the alternate embodiment of the present invention. The boundary of the battery door 104 is demarcated by parting lines 902 visible in the housing 102, as shown in FIG. 9. When the battery door 104 is removed, greater access to the battery compartment 602 is provided. When the battery door latch 106 is in the latched position, the tongue 402 engages with a slot 610, thereby latching the battery door 104. The battery door 104 is secured to the housing 102 by undercuts 608 and slots 606, as described above. When the batteries are placed within the battery compartment 602, the side walls 112 of the housing 102 retain the batteries 406 within the battery compartment 602, reducing any lateral force against the side wall formed by the battery door 104.

In summary, a battery door latch has been described above which provides convenient access to the batteries of an electronic device by the user of the electronic device, visually alerts the user of the electronic device when the battery door latch is in the unlatched position, and is concealed by the ornamental design of the electronic device when the battery door latch is in the latched position. The battery door latch can be retained within either a wall of the housing or a wall of the battery door. The location of the battery door latch is not limited to being positioned relative to a side wall of the housing, but can also be positioned on the front or back surface of the housing provided that an ornamental design formed thereon conceals the battery door latch when the battery door latch 106 is in the latched position.

It will be appreciated that the present invention is not limited to locating the battery door latch in a side wall of the housing or the battery door as described above. The battery door latch can be located on any surface of the housing or battery door so long as the battery door latch is concealed by the ornamental design of the housing, the battery door and the battery door latch when the battery door latch is in the latched position, and visually alerts the user that the battery door is unlatched when the battery door latch is in the unlatched position. It will also be appreciated that the ornamental design is not limited to styling grooves having parallel grooves and ridges. Any ornamental design which is contiguous across the surface of the housing and the battery door latch, or the battery door and the battery door latch, and which conceals the battery door latch when the battery door latch is in the latched position, and visually alerts the user that the battery door is unlatched when the battery door latch is in the unlatched position lies within the scope and spirit of the present invention.

I claim:

1. An electronic device having a concealed battery door latch comprising:

a housing having a surface located adjacent to a battery compartment and including an ornamental design;

a battery door for sealing said battery compartment; and a battery door latch, moveable between a latched position and an unlatched position, for latching and unlatching said battery door, said battery door latch being retained within said surface of said housing and including an ornamental design which matches said ornamental design of said surface of said housing, wherein said battery door latch is concealed by said ornamental design when said battery door latch is placed in the latched position.

2. The electronic device according to claim 1, wherein said ornamental design on said battery door latch indicates when said battery door latch is placed in the unlatched position.

3. The electronic device according to claim 1, wherein said housing has a front surface, a back surface and four side walls, and wherein said surface of said housing is one of said four side walls.

4. The electronic device according to claim 1 wherein said battery door latch comprises:

a moveable body incorporating said ornamental design; and a tongue for latching said battery door.

5. The electronic device according to claim 4 wherein said ornamental design on said moveable body provides a finger grip for latching and unlatching said battery door latch.

6. The electronic device according to claim 1, wherein said electronic device is a selective call receiver.

7. An electronic device having a concealed battery door latch comprising:

a housing having a top surface, a bottom surface, and four side walls, said four side walls having styling grooves formed thereon, at least one of said four side walls located adjacent to a battery compartment;

a battery door for sealing said battery compartment; and a battery door latch, moveable between a latched position and an unlatched position, for latching and unlatching said battery door, said battery door latch including styling grooves which match said styling grooves on said at least one of said four side walls when said battery door latch is placed in the latched position.

8. The electronic device according to claim 7, wherein said styling grooves on said battery door latch indicates when said battery door latch is placed in the unlatched position.

9. The electronic device according to claim 7 wherein said battery door latch comprises:

a moveable body incorporating said styling grooves; and a tongue for latching said battery door.

10. The electronic device according to claim 9 wherein said styling grooves on said moveable body provides a finger grip for latching and unlatching said battery door latch.

11. The electronic device according to claim 7 wherein said styling grooves are uniform grooves and ridges.

12. The electronic device according to claim 11 wherein said uniform grooves and ridges have a square cross section.

13. The electronic device according to claim 7, wherein said battery door includes styling grooves matching at least a portion of said styling grooves of said housing.

14. The electronic device according to claim 7, wherein said electronic device is a selective call receiver.

15. An electronic device having a concealed battery door latch comprising:

a housing having one or more surfaces which include an ornamental design;

a battery door for sealing a battery compartment, said battery door having a surface which includes an ornamental design matching said ornamental design of said housing; and a battery door latch, moveable between a latched position and an unlatched position, for latching and unlatching said battery door, said battery door latch retained within said surface of said battery door and including an ornamental design which matches said ornamental design of said housing, wherein said battery door latch is concealed by said ornamental design when said battery door latch is placed in the latched position.

16. The electronic device according to claim 15, wherein said ornamental design on said battery door latch indicates when said battery door latch is placed in the unlatched position.

17. The electronic device according to claim 15, wherein said housing has a front surface, a back surface and four side walls, and wherein said surface of said housing is one of said four side walls.

18. The electronic device according to claim 15 wherein said battery door latch comprises:

a moveable body incorporating said ornamental design; and a tongue for latching said battery door.

19. The electronic device according to claim 18 wherein said ornamental design on said moveable body provides a finger grip for latching and unlatching said battery door latch.

20. The electronic device according to claim 15, wherein said electronic device is a selective call receiver.

* * * * *